(12) United States Patent
Couillard

(10) Patent No.: US 7,023,816 B2
(45) Date of Patent: Apr. 4, 2006

(54) METHOD AND SYSTEM FOR TIME SYNCHRONIZATION

(75) Inventor: Bruno Couillard, Gatineau (CA)

(73) Assignee: SafeNet, Inc., Belcamp, MD (US)

( * ) Notice: Subject to any disclaimer, the term of this patent is extended or adjusted under 35 U.S.C. 154(b) by 765 days.

(21) Appl. No.: 09/735,941

(22) Filed: Dec. 13, 2000

(65) Prior Publication Data

US 2003/0123491 A1    Jul. 3, 2003

(51) Int. Cl.
*H04J 3/06* (2006.01)

(52) U.S. Cl. .................. 370/324; 370/508; 370/519; 375/356

(58) Field of Classification Search ............ 370/252, 370/255, 282, 324, 422, 463, 503, 507, 508, 370/509, 510, 512, 518, 519, 520; 375/222, 375/326, 346, 354, 356, 357, 358; 455/11.1, 455/502; 701/213
See application file for complete search history.

(56) References Cited

U.S. PATENT DOCUMENTS

| | | | | |
|---|---|---|---|---|
| 4,602,375 | A * | 7/1986 | Inukai | 375/358 |
| 4,792,963 | A * | 12/1988 | Campanella et al. | 375/358 |
| 5,428,645 | A | 6/1995 | Dolev et al. | 375/354 |
| 5,450,394 | A | 9/1995 | Gruber et al. | |
| 5,535,217 | A | 7/1996 | Cheung et al. | 370/100.1 |
| 6,023,769 | A | 2/2000 | Gonzalez | 713/400 |
| 6,064,701 | A | 5/2000 | Tresser et al. | 375/285 |
| 6,199,169 | B1 | 3/2001 | Voth | |
| 6,539,003 | B1 * | 3/2003 | Agarwal et al. | 370/324 |
| 6,633,590 | B1 * | 10/2003 | Garofalo et al. | 370/507 |

OTHER PUBLICATIONS

Christian, F., et al, "Probabilistic internal clock synchronization", IEEE Comput. Soc., Oct. 1994.
Mills, D. L., "Internet Time Synchronization: The Network Time Protocol", Network Working Group Request for Comments, no. 1129, Oct. 1989.
Perrig, A. et al, "Efficient authentication and signing of multicast streams over lossy channels", IEEE Comput. Soc. May 2000.

* cited by examiner

*Primary Examiner*—Wellington Chin
*Assistant Examiner*—John Shew
(74) *Attorney, Agent, or Firm*—Venable LLP; Edward W. Yee; Caroline J. Swindell

(57) ABSTRACT

A method for synchronizing a timing device of a client station via a communications network is disclosed. A plurality of packets is sent from a time server to the client station via the communications network. Upon receipt of the plurality of packets at the client station a time indicative of a local time of receipt of the plurality of packets is determined and the plurality of packets are returned to the time server via the communications network. Upon receipt of the plurality of packets at the time server data in dependence upon round trip delay of the packets and variance in packet spacing are determined and compared to threshold values. If the determined data are within the threshold values data indicative of a time correction are determined and sent from the time server to the client station.

20 Claims, 15 Drawing Sheets

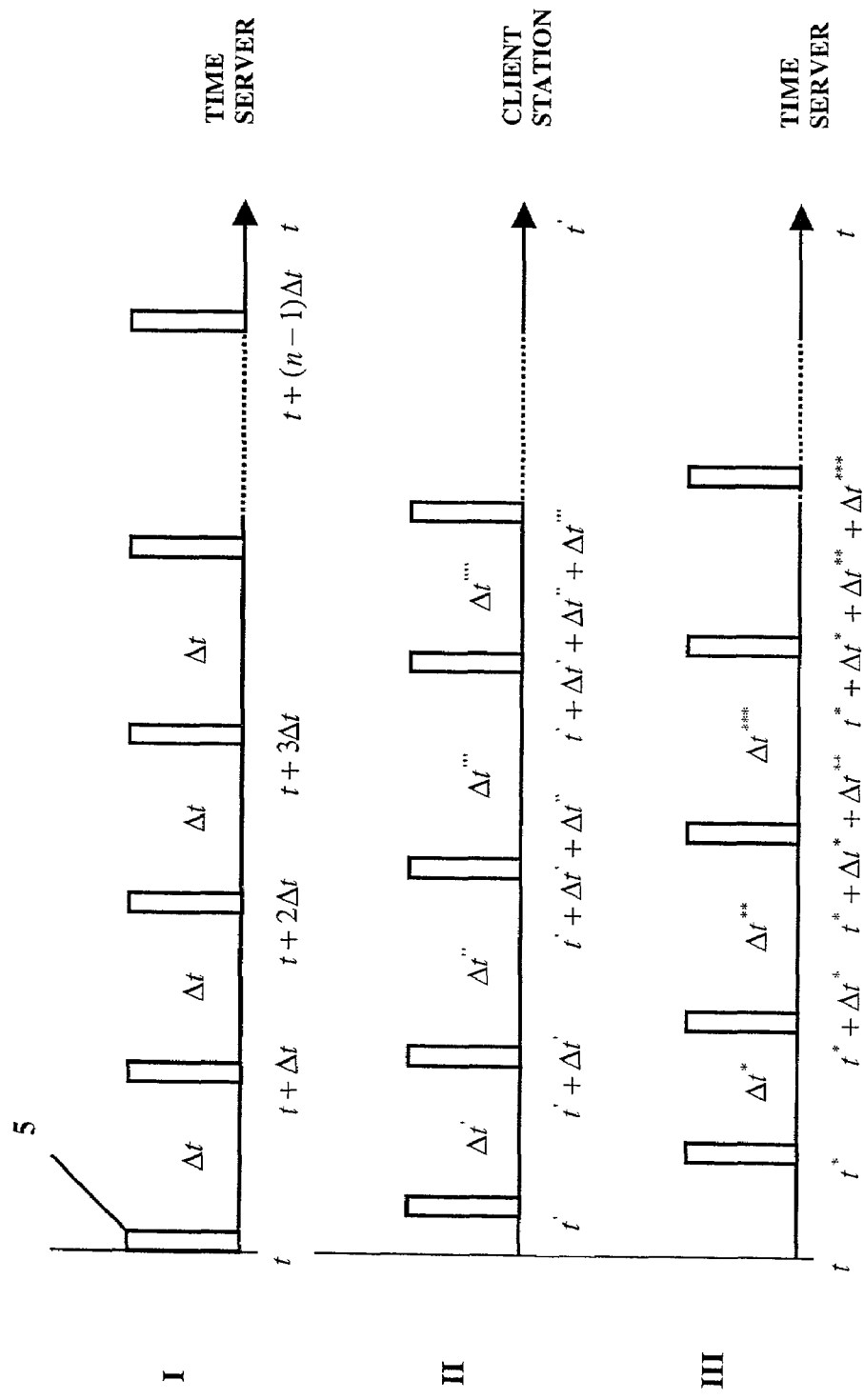

METHOD AND SYSTEM FOR TIME SYNCHRONIZATION

FIELD OF THE INVENTION

This invention relates to time synchronization, and in particular to a method for synchronizing a time clock of a client station via a communications network having an unknown transmission time.

BACKGROUND OF THE INVENTION

Most conventional computer systems maintain an internal clock to keep track of the time of day. Accurate time of day measurements are required in a wide variety of applications such as managing and tracking electronic mail, timing back-ups of data on a network, synchronizing communications between clients and servers, managing multimedia teleconferences, and assigning a correct time to documents or transactions. Since the internal clock is not perfectly accurate, as time goes by the internal time maintained by the internal clock diverges from the external time with which the internal clock was previously synchronized. This time divergence is sometimes called "clock drift". Typically the internal clock's time drifts away from the time as a linear function of elapsed time since synchronization. To prevent the clock drift from getting too large, from time to time the internal clock is resynchronized with the external reference time. Time services exist which provide accurate time information using an "atomic clock". One well-known time service is WWV, which broadcasts a Universal Time Signal. Various solutions have been developed to synchronize the time clock of a computer system. A simple method is for a user of the computer system to manually adjust the clock whenever the clock appears to have drifted. This technique, however, is both inconvenient for the user and subject to its own inaccuracies.

Also, time sources such as WWV occasionally introduce "leap seconds" to synchronize their time with the motions of the planet Earth. To prevent error from accumulating due to drift and leap seconds, it is particularly desirable to synchronize the internal clock of a computer system with the external reference time automatically without intervention of a user or network administrator.

Some prior art methods for synchronizing the internal clock employ a round trip scheme in which a computer system sends a synchronization request to a time service and the time service responds by sending a synchronization message. The inaccuracy of time provided to a computer system is directly related to the total elapsed time for the round trip sequence of messages. Thus, the precision with which clock synchronization can be achieved is limited by the time required for the round trip sequence.

A particular type of round trip synchronization, called Probabilistic Clock Synchronization has been used for synchronizing internal times of computer systems with a reference time from an external source via a communications network. The technique is described in Cristian, "Probabilistic Clock Synchronization", IBM Technical Disclosure Bulletin, Vol. 31, No. 2 (July 1988), p. 91 which is incorporated herein by reference. The basic round trip sequence works as follows: A client station sends a synchronization request at a time t, according to its clock. A time server responds with a message giving a time T, according to the server's time clock. The client station receives the response at a time t'. It is thus established that the server's time T falls somewhere within the time interval between the client stations times t and t'. Preferably, T is synchronized with the midpoint of the interval between t and t'. Thus, the precision of the client station's synchronization is accurate to within (t'−t)/2. If the achieved precision is not considered good enough, the round trip message exchange sequence is repeated. This method provides means for taking the roundtrip delay time into account and, therefore, reduce the error occurring due to the transmission. However, this method requires a substantial amount of processing in real time.

An improved version of "Cristian's" method is disclosed by Cheung et al. in U.S. Pat. No. 5,535,217 issued Jul. 9, 1996, which is incorporated herein by reference. Enhanced precision is achieved by computing a new precision range for the synchronized time based on an intersection between precision intervals of the client station's time and the time server's time. Unfortunately, also this method requires a substantial amount of processing in real time. Furthermore, both methods determine the time elapsed to transmit a message from the time server to the client station as half the round trip delay.

In U.S. Pat. No. 6,023,769 issued Feb. 8, 2000, Gonzalez discloses a method and apparatus for synchronizing an imprecise time clock maintained by a computer system wherein a first time reading is obtained from a local timing service at a precision greater than that of the clock, and a second time reading is obtained from a remote time server at a precision greater than that of the clock. The second time reading from the time server is corrected for delays associated with the transmission over the network using the first time reading from the local timing service. This method may be able to give a more correct estimate of the time elapsed to transmit a message from the remote time server to the client station. However, it requires messages being transmitted between the client station and the local timing service at a known transmission time or at a time less than the precision error of the local timing service.

Furthermore, none of these methods provide means for preventing tampering with the messages, for example, deliberately delaying the messages by a third unauthorized party.

It is an object of the invention to provide a method for synchronizing a timing device of a client station that substantially reduces the error due to round trip delay.

It is further an object of the invention to provide a method for synchronizing a timing device of a client station that substantially reduces real time processing at the time server as well as at the client station.

It is yet another object of the invention to provide a method for synchronizing a timing device of a client station that substantially reduces the risk of tampering by an unauthorized third party.

SUMMARY OF THE INVENTION

In accordance with the invention there is provided, a method for synchronizing a timing device of a client station. The method comprises the steps of:

sending a plurality of packets, each packet being sent at a predetermined time, from a time server to the client station via a communications network;

receiving the plurality of packets at the client station;

determining a time indicative of a local time of receipt of the plurality of packets at the client station and storing time data in dependence thereon;

returning the plurality of packets to the time server via the communications network;

determining a time indicative of a local time of receipt of the plurality of packets at the time server; and, determining data in dependence upon round trip delay of the packets and variance in packet spacing and comparing the data to threshold values.

In accordance with the invention there is provided, a method for synchronizing a timing device coupled to a communications network. The method comprises the steps of:

sending a plurality of packets, each packet being sent at a predetermined time, from a first node to a second node via a communications network;

receiving the plurality of packets at the second node;

determining a time indicative of a local time of receipt of the plurality of packets and providing time data in dependence thereon;

returning the plurality of packets to the first node via the communications network;

determining a time indicative of a local time of receipt of the plurality of packets at the first node; and, determining data in dependence upon round trip delay of the packets and variance in packet spacing and comparing the data to threshold values.

In accordance with the invention there is further provided, a system for synchronizing a timing device of a client station via a communications network. The system comprises:

first processing means connected to the communications network and a time clock; and, second processing means connected to the communications network and the timing device, wherein the first processing means comprise:

means for sending in real time a plurality of packets, each packet being sent at a predetermined time, via the communications network to second processing means;

means for receiving the plurality of packets from the second processing means in real time;

means for determining in real time a time indicative of a time of receipt of each of the plurality of packets;

means for determining data in dependence upon round trip delay of the packets and variance in packet spacing and comparing the data to threshold values;

means for determining data indicative of a correct time in dependence upon time data from the time clock and the data in dependence upon round trip delay of the packets and variance in packet spacing; and, means for sending a signal comprising the data indicative of a time correction to the second processing means via the communications network; and, wherein the second processing means comprise:

means for receiving a plurality of packets from the first processing means in real time;

means for determining in real time a time indicative of a time of receipt of each of the plurality of packets;

means for returning the plurality of packets in real time to the first processing means;

means for receiving a signal comprising the data indicative of a time correction from the first processing means; and, means for synchronizing the timing device in dependence upon the data indicative of the time correction.

BRIEF DESCRIPTION OF THE DRAWINGS

Exemplary embodiments of the invention will now be described in conjunction with the drawings, in which:

FIG. 1c is a timing diagram illustrating timing of the plurality of pulses according to the disclosed method for synchronizing a timing device;

DETAILED DESCRIPTION OF THE INVENTION

Figure 1A:
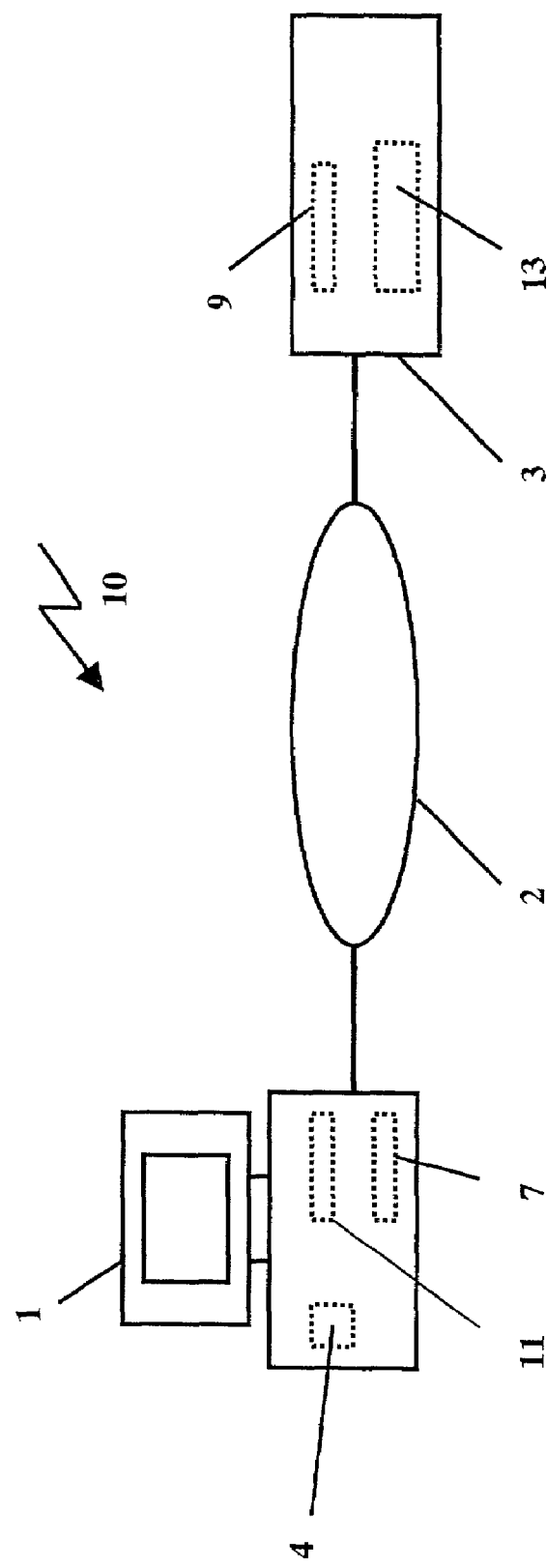
FIG. 1a is a schematic diagram of a client station connected to a time server via a communications network according to the invention.
Figure 1B:
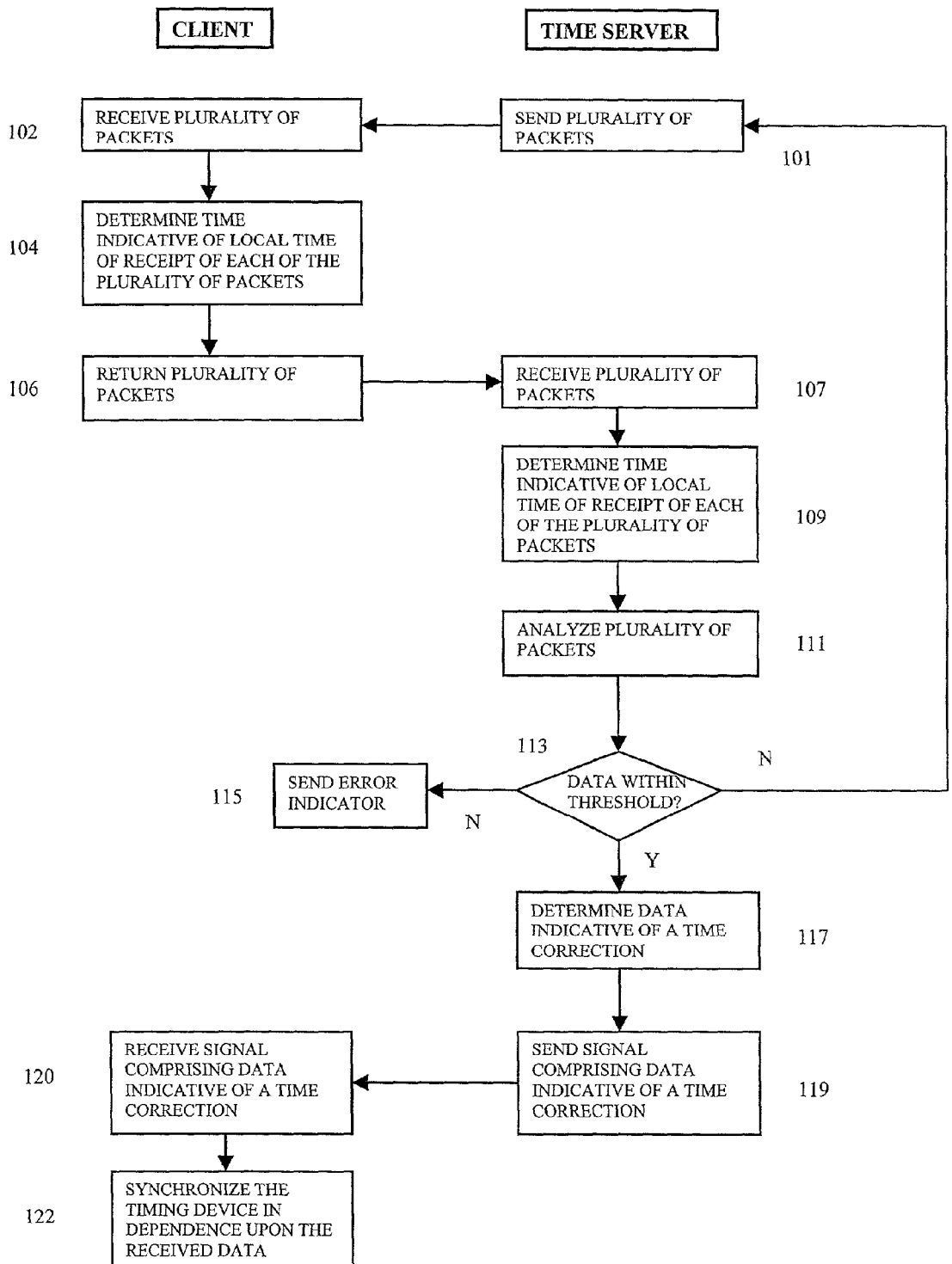
FIG. 1b is a simplified flow diagram of a method for synchronizing a timing device of a client station according to the invention.

Referring to FIGS. 1a and 1b, a method for synchronizing a timing device 4 of a client station 1 according to the invention is shown. The client station 1 of system 10 is connected to a time server 3 via a communications network 2 such as the Internet. The time server 3 sends a plurality of digital signals (hereinafter, referred to simply as "packets"), each comprising m bits, at predetermined times via the communications network 2 to the client station 1, shown in FIG. 1b as step 101. Preferably, each packet comprises an identifier, for example the number of the packet, and an identifier of the time server 3 in the form of at least a random number. Upon receipt 102 of each of the packets at the client station 1, a time indicative of a local time of receipt of each of the packets is determined and time data in dependence thereon are stored 104. The packets are then returned 106 to the time server 3 via the communications network 2, where upon receipt 107 a time indicative of a local time of receipt of each of the plurality of packets is determined 109. FIG. 1c shows a distribution of the packets versus a time axis for steps 102, 106, and 107, respectively, indicated by I, II, and III. At a predetermined time t the server sends n packets 5 such that time intervals Δt between consecutive packets are a same, shown in diagram I. As is obvious to a person of skill in the art, same time intervals between consecutive packets is preferred but not required for the invention. Diagram II shows the distribution of the n packets 5 upon receipt at the client station 1 versus a local time axis t'. Due to random variations of the transmission speed of each of the packets, the time intervals between consecutive packets will be different, as indicated by Δt',Δt",Δt'", . . . . In diagram III the distribution of the n packets 5 upon receipt at the time server 3 versus a local time axis t is illustrated. The first packet arrives at a time $t^x$, which is the predetermined time t plus a round trip delay for the first packet. Time differences between consecutive packets arriving at the time server are again different and differ from the respective time differences in diagram II as well, as indicated by Δt*,Δt,Δt*, . . . . Variations in the round trip delays of the n packets provides useful information about network behavior during the transmission such as random variations of the transmission speeds or a slow down of the communications network 2. if the number n of the packets is sufficiently large (for example: n=100).

In step 111 the packets are analyzed in order to determine data in dependence upon round trip delay and variations in spacing between consecutive packets. These data are then compared to threshold values 113 and if the data are within the threshold values the process of time correction is continued. In step 117 data indicative of a time correction are determined and a signal comprising the data indicative of a time correction is sent from the time sever 3 to the client station 1 as shown in step 119. Methods for determining the data of a time correction according to the invention will be described in detail at a later point. Upon receipt 120 of the signal comprising the data indicative of a time correction the timing device 4 of the client station 1 is synchronized accordingly 122.

If the data in step 113 are not within the threshold values, the steps 101 to 113 are repeated or an error indicator is sent 115 notifying a user of the client station 1 or a network administrator. Preferably, the threshold values are determined using a statistical evaluation of the round trip delays within the network. This allows detection of any irregularities in the communications network such as technical problems or an attack of a "Man in the Middle" delaying transmission of the packets.

Steps 101 to 109 of the method according to the invention are performed in real time. These steps do not require much processing and can easily be performed by a processor in parallel to other tasks. The more elaborate steps 111 to 117 may be performed at any time, for example, when workload of a processor is reduced. Therefore, the method according to the invention obviates the need for large processing capacity of the time server 3 compared to the prior art.

Figure 2A:
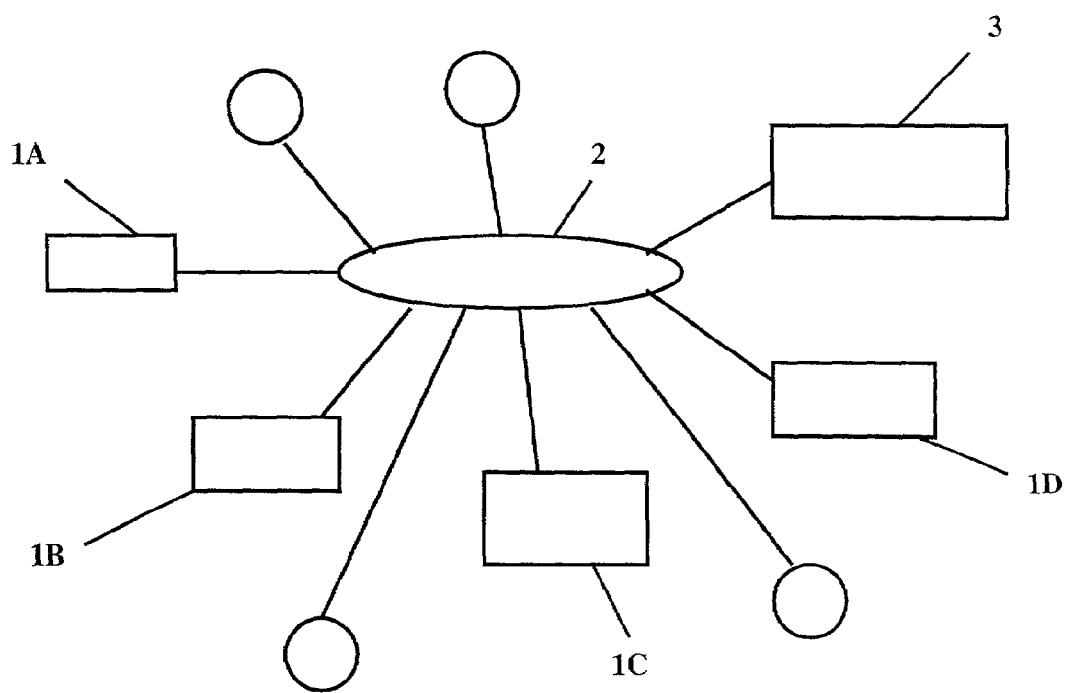
FIG. 2a is a schematic diagram of a plurality of client stations connected to a time server via a communications network.
Figure 2B:
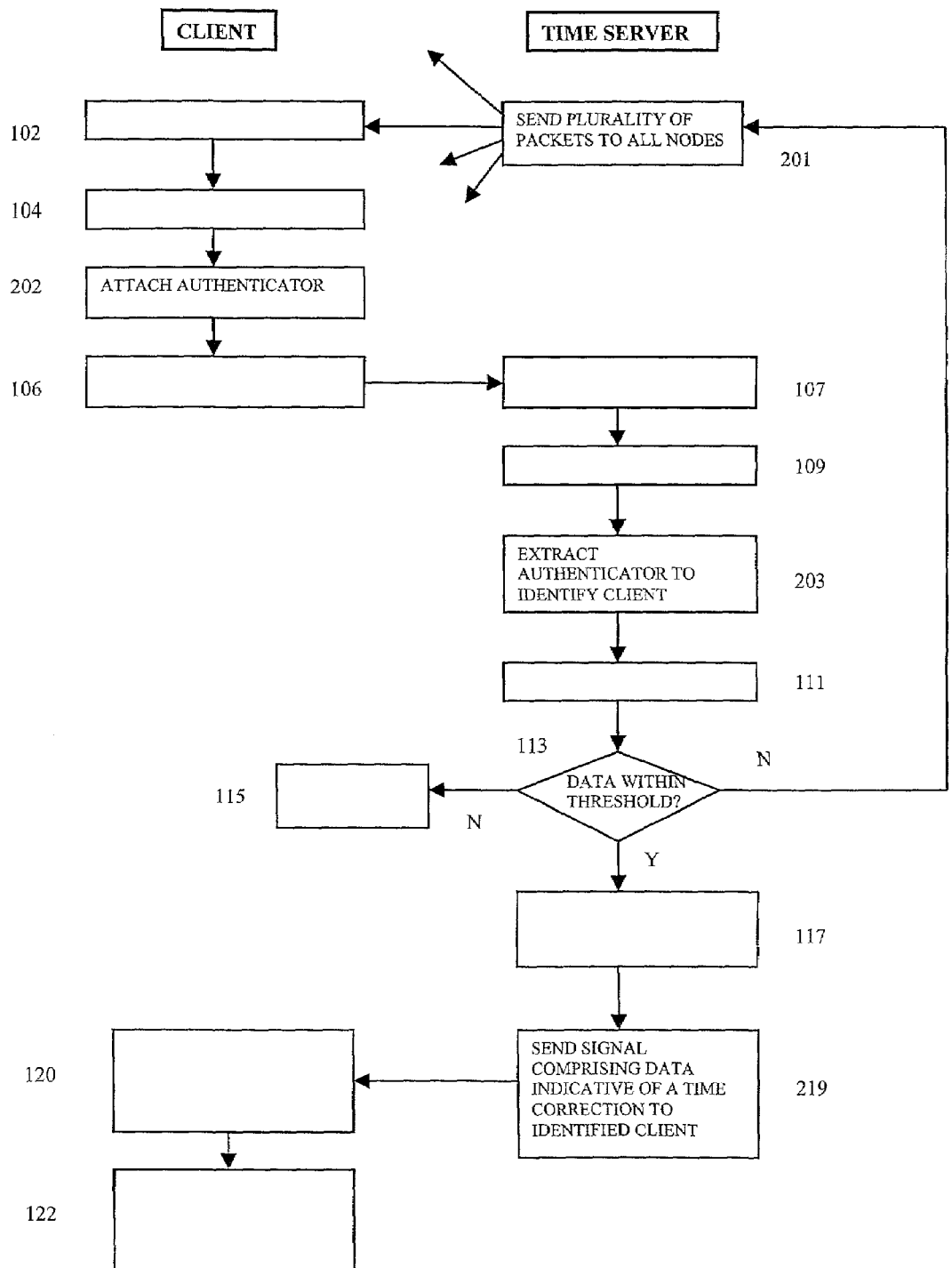
FIG. 2b is a simplified flow diagram of another embodiment of the method for synchronizing a timing device of a client station according to the invention.

In another embodiment of the method according to the invention the time server 3 sends 201 a plurality of packets to all nodes of a communications network 2, as shown in FIGS. 2a and 2b. Non responding nodes are indicated by circles in FIG. 2a. Responding client stations 1A to 1D, for example, attach 202 to at least one of the packets an authenticator identifying the client station before returning them to the time server 3. The time server 3 extracts the authenticator from each plurality of packets received from the client stations 1A to 1D in step 203 in order to identify each responding client station before further processing the packets accordingly. A signal comprising the data indicative of a time correction is then sent 219 to each identified client station. This method further reduces the workload of the processor of the time server 3 by sending only one plurality of packets for synchronizing a plurality of clients 1A to 1D.

Figure 3:
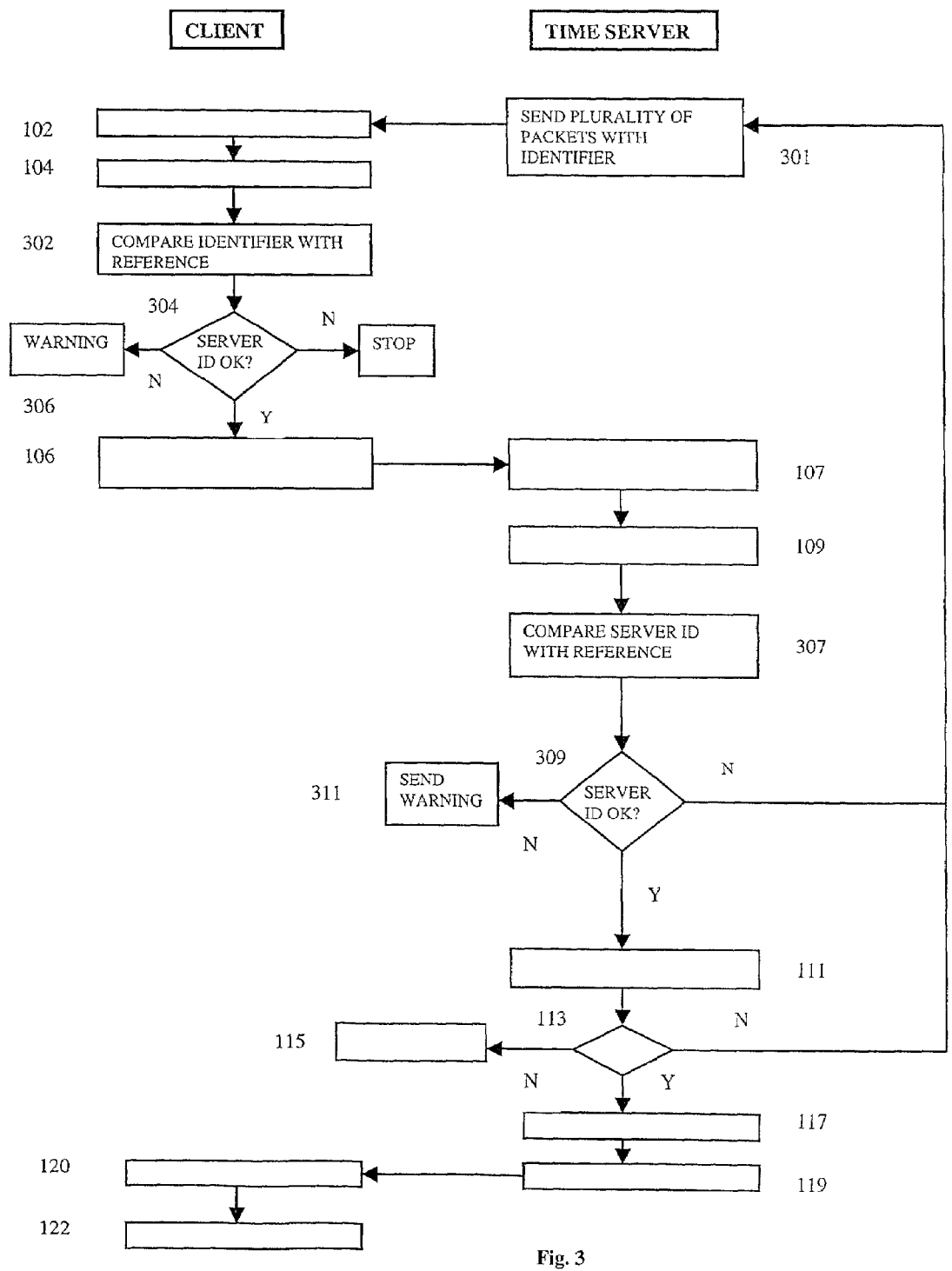
FIG. 3 is a simplified flow diagram of another embodiment of the method for synchronizing a timing device of a client station according to the invention.

Referring to FIG. 3, another embodiment of the method according to the invention is shown. Each of the plurality of packets sent 301 from the time server comprises a tamper proof identifier of the time server 3. For example, a tamper proof identifier includes a random number or a signed identification as is obvious to a person of skill in the art. The client station compares the identifier with a reference 302 and if the time server 3 is identified returns the packets 106. If the time server cannot be identified the synchronization process is stopped by the client station. Optionally, the client station 1 sends a warning signal 306 to the time server 3 or a network administrator when server identification fails. The time server 3 itself compares the identification with a reference in step 307 and continues with the synchronization process if the packets have been identified 309 as the ones sent by the time server 3. If the packets cannot be identified 309 by the time server 3 the synchronization process is optionally repeated with step 301 and/or the time server may sent a warning message 311. Therefore, this method substantially enhances security by providing means to reliably recognize if the packets had been tampered with by an unauthorized third party.

Figure 4:
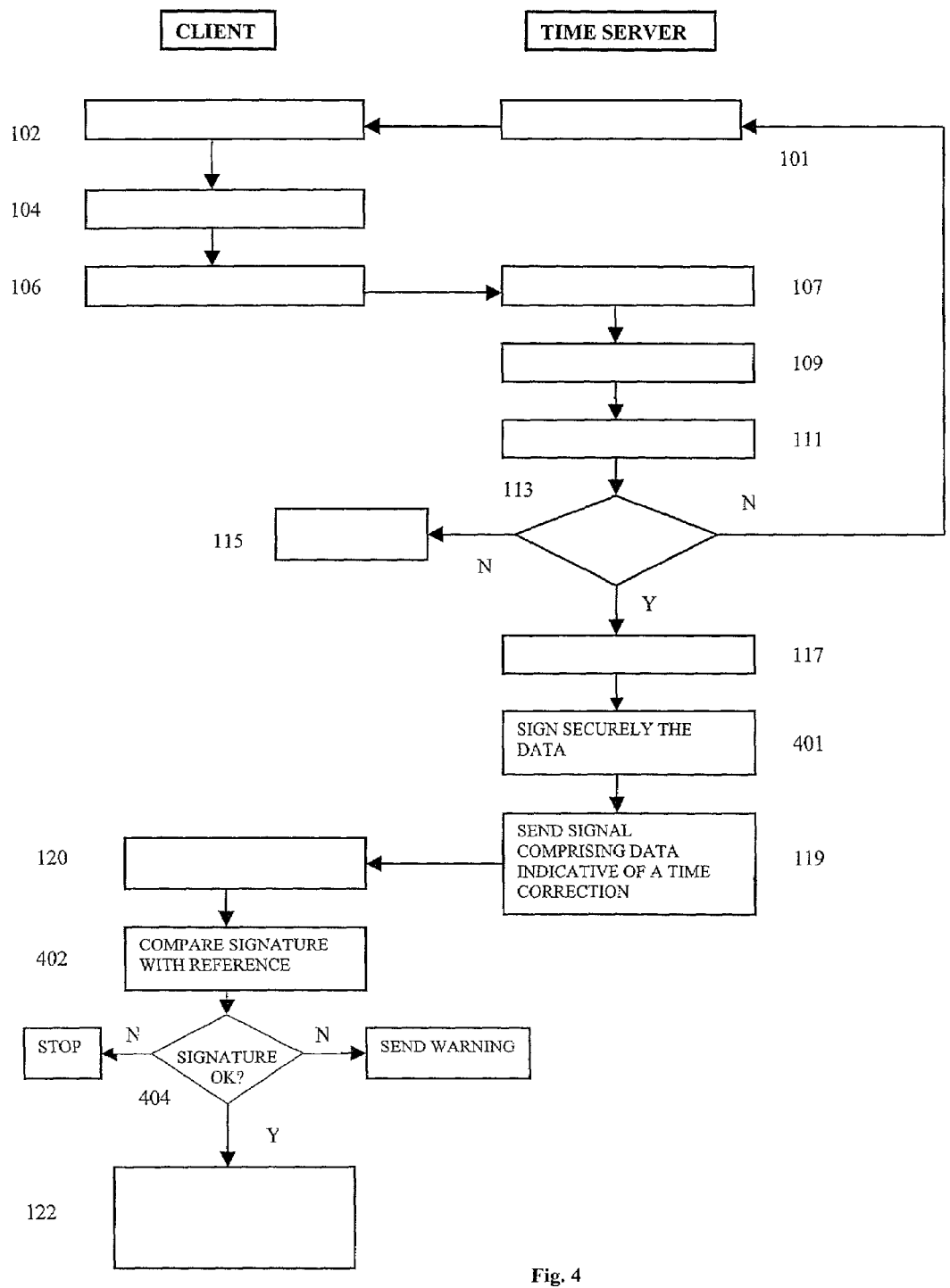
FIG. 4 is a simplified flow diagram of another embodiment of the method for synchronizing a timing device of a client station according to the invention.

Security is further enhanced by securely signing the data indicative of a time correction, as shown in step 401 in FIG. 4. The client station 3 compares the signature with a reference 402 and synchronizes its timing device 4 only after the comparison is indicative of a match 404. Methods for securely signing the data, for example, encryption algorithms are well known in the art.

Figure 5:
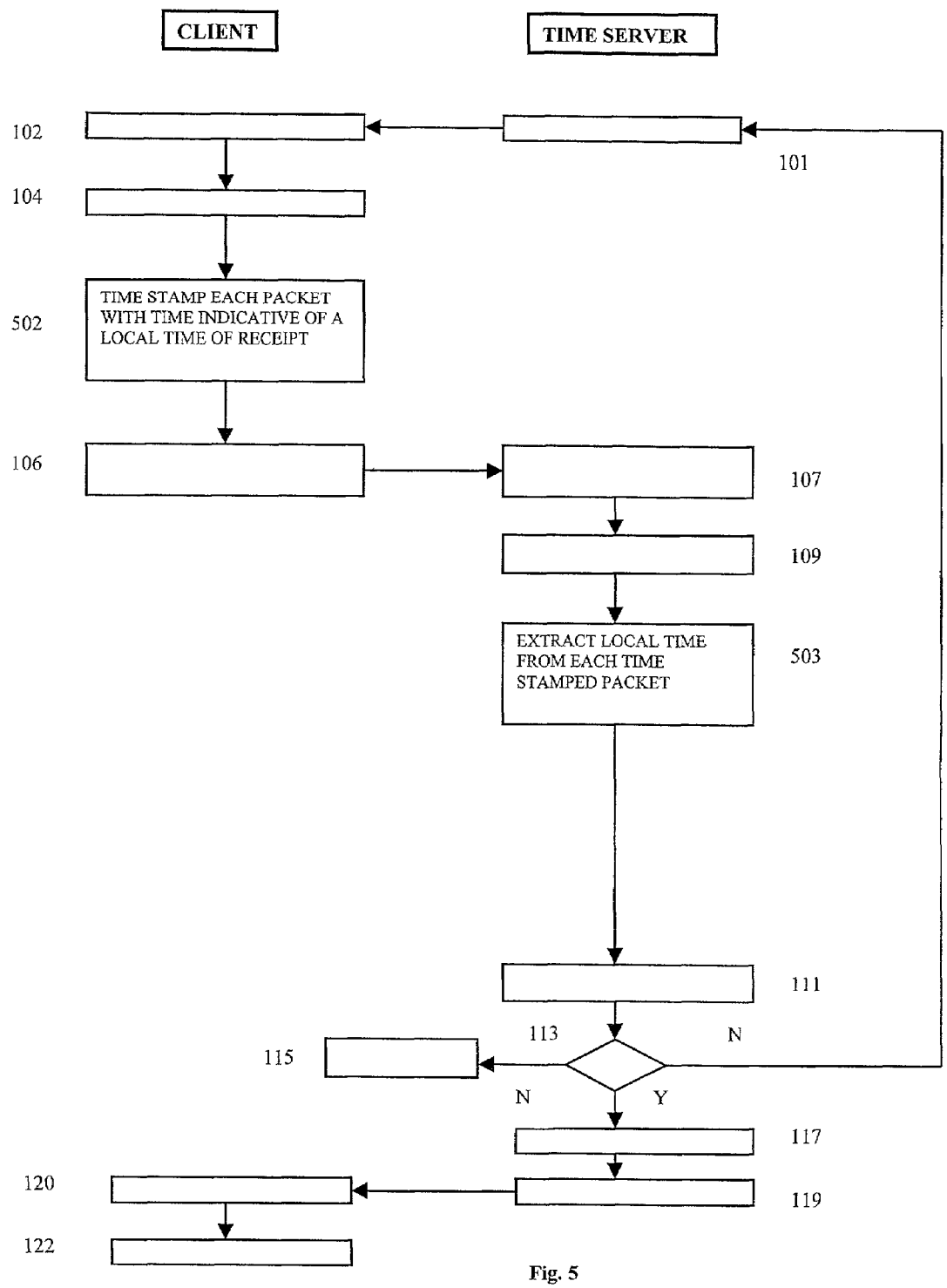
FIG. 5 is a simplified flow diagram of yet another embodiment of the method for synchronizing a timing device of a client station according to the invention.

FIG. 5 shows yet another embodiment of the method according to the invention. In step 502 each packet is time stamped at the client station 1 with data indicative of a local time of receipt of the packet at the client station 1. This method provides valuable information to the time server 3 which is there extracted 503 for a more accurate estimate of a transmission time needed by a packet to travel from the time server 3 to the client 1, thus enhancing accuracy of the synchronization. The method for determining the transmission time according to the invention is discussed hereinbelow.

Figure 6:
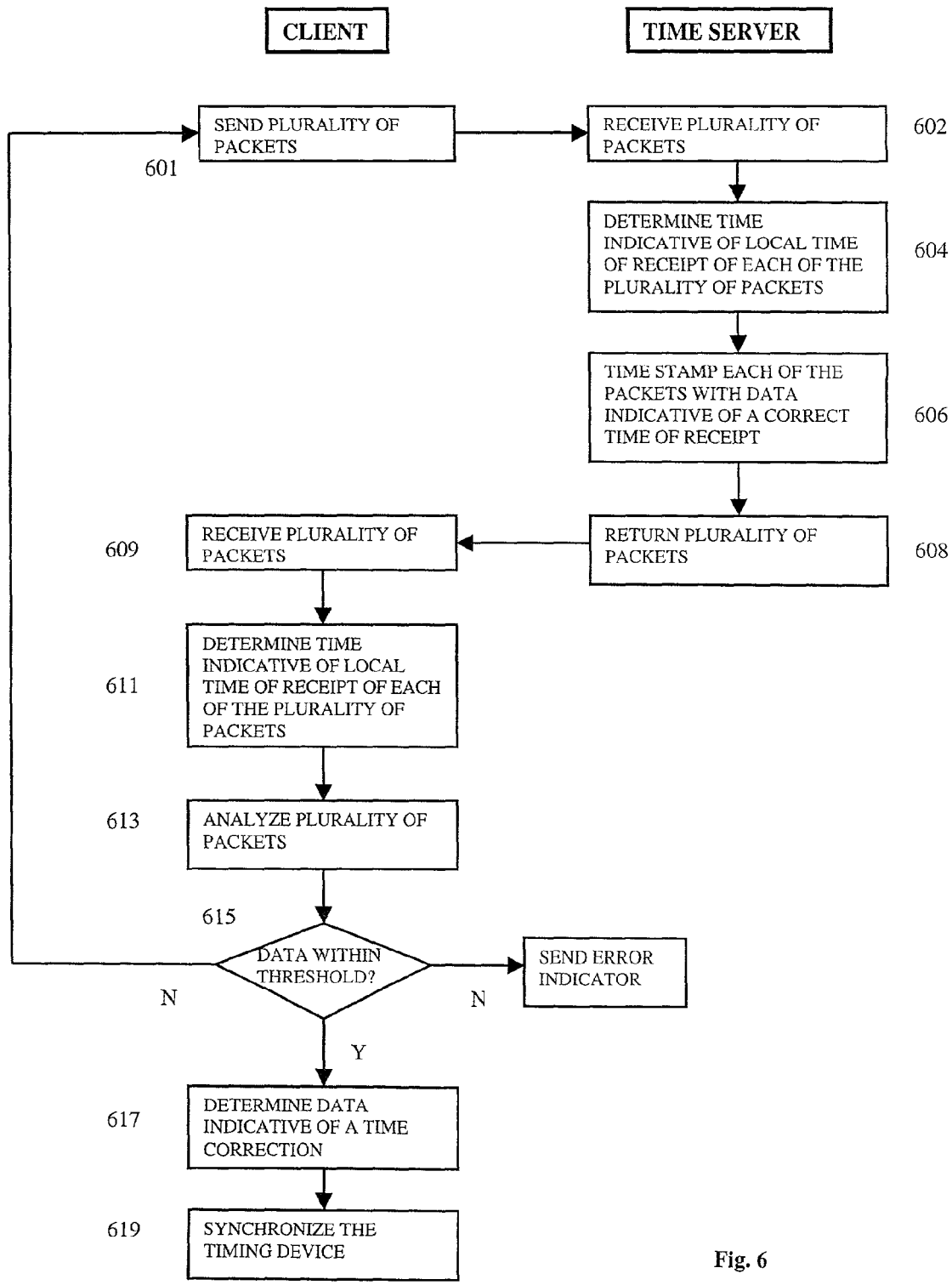
FIG. 6 is a simplified flow diagram of another method for synchronizing a timing device of a client station according to the invention.

FIG. 6 illustrates another method for synchronizing a timing device 4 of a client station 1 according to the invention. The client station 1 sends 601 a plurality of packets, each at a predetermined time via communications network 2 to time server 4. Upon receipt 602 of the packets the time server 3 determines 604 data indicative of a correct time of receipt of each of the plurality of packets and time stamps 606 each of the packets with the data indicative of the correct time of receipt of the packet. The time stamped packets are then returned 608 to the client station 1 via the communications network 2. Upon receipt 609 of the packets the client station 1 determines 611 data indicative of a local time of receipt for each of the plurality of packets. In step 613 the packets are analyzed in order to determine data in dependence upon round trip delay and variations in spacing between consecutive packets. These data are then compared to threshold values 615 and if the data are within the threshold values data indicative of a time correction are determined 617. In step 619 the timing device 4 of the client station 1 is synchronized according to the data indicative of a time correction.

This method requires only minimal processing capabilities for the time server 3, all steps concerning data evaluation are done by the client station. Furthermore, only steps 601 to 611 have to be performed in real time, leaving the elaborate steps of data evaluation—steps 613 to 619—for times of minimum workload of the client station 1.

As is evident to a person of skill in the art, all embodiments discussed with reference to FIGS. 3, 4, and 5 are also applicable to this method according to the invention as well as the following embodiments for the determination of data indicative of a time correction.

In the following, various methods according to the invention for determining data indicative of a time correction used in step 117 are described.

Figure 7A:
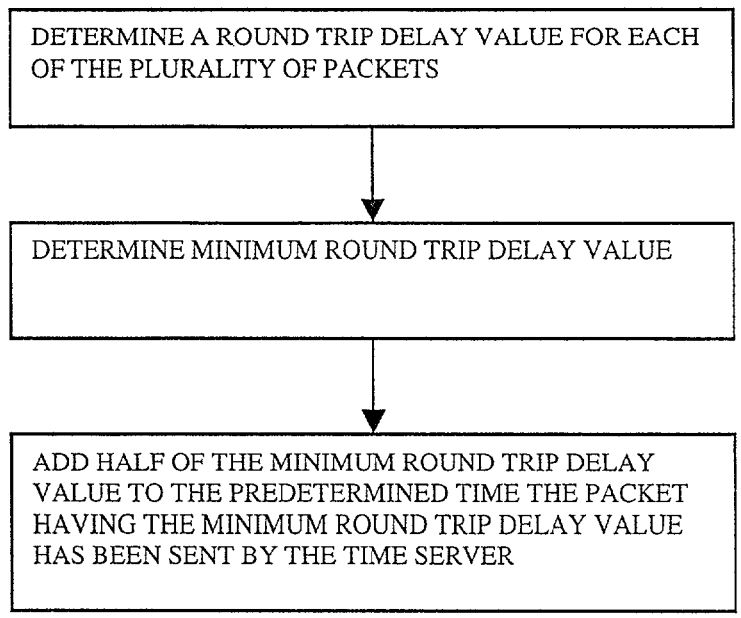
FIG. 7a is a simplified flow diagram of a method for determining data indicative of a time correction according to the invention.

A first simple method for determining data indicative of a time correction is illustrated in FIG. 7a. A round trip delay value for each of the plurality of packets is determined as difference between the time each packet has been received at the time server 3 and the predetermined time each packet has been sent from the time server 3. A minimum round trip delay value is determined among the round trip delay values of each of the plurality of packets. Data indicative of a correct time are then calculated by adding half of the minimum round trip delay value to the predetermined time the packet having the minimum round trip delay value has been sent by the server.

Figure 7B:
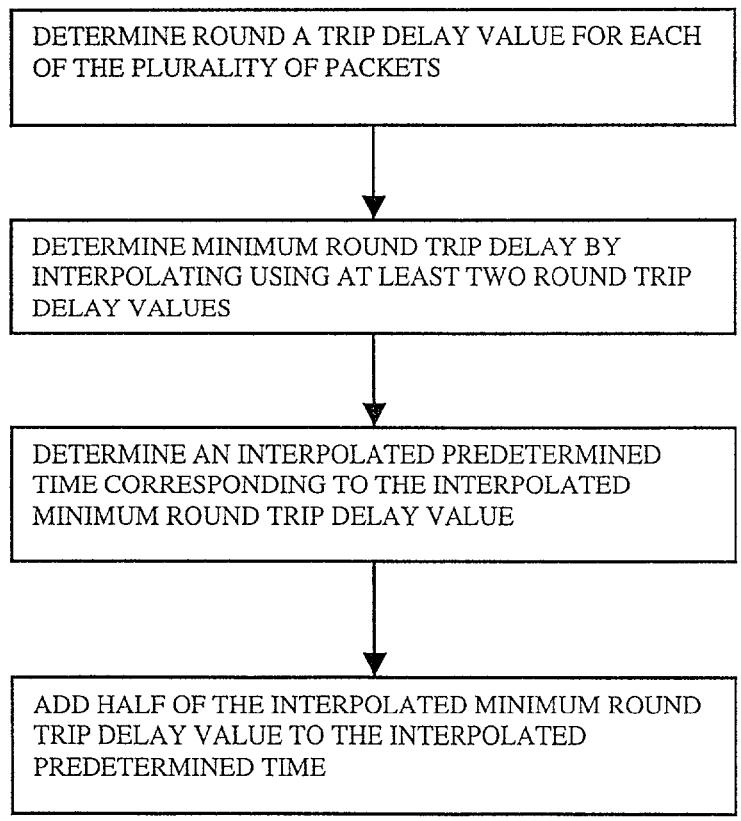
FIG. 7b is a simplified flow diagram of another method for determining data indicative of a time correction according to the invention.

FIG. 7b shows an improved embodiment of the previous method, which is preferable if the round trip delays of the packets vary considerably. Here, interpolation using at least two round trip delay values is applied in order to determine a more accurate minimum round trip delay value. In an additional step, a predetermined time corresponding to the interpolated minimum round trip delay value is calculated. Data indicative of a correct time are then calculated by adding half of the interpolated minimum round trip delay value to the interpolated predetermined time.

The assumption that the transmission time of a packet from the time server 3 to the client 1 station is half the round trip time of the packet does not take into account variations of the transmission speed between the transmission to the client station 1 and the transmission to the time server 3. Therefore, use of these methods can result in rather inaccurate time corrections. More accurate methods according to the invention for calculating the transmission time of the packets from the time server 3 to the client station 1 will be described in the following. Despite the fact that the following methods are more elaborate concerning the determination of a time correction they do not require substantially more processing capabilities. Most steps do not require processing in real time and are performed at any available timeslot.

Figure 7C:
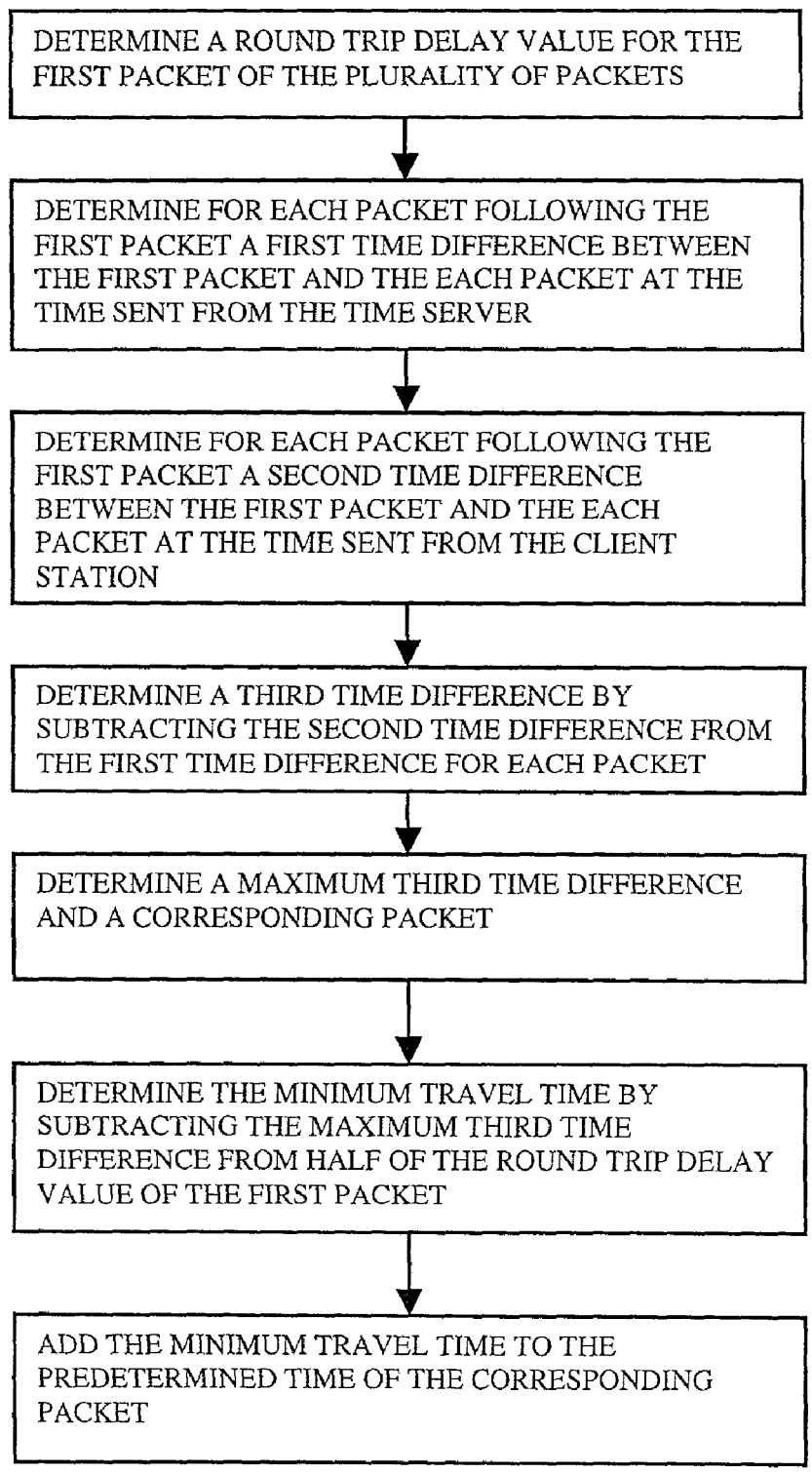
FIG. 7c is a simplified flow diagram of another method for determining data indicative of a time correction according to the invention.
Figure 7D:
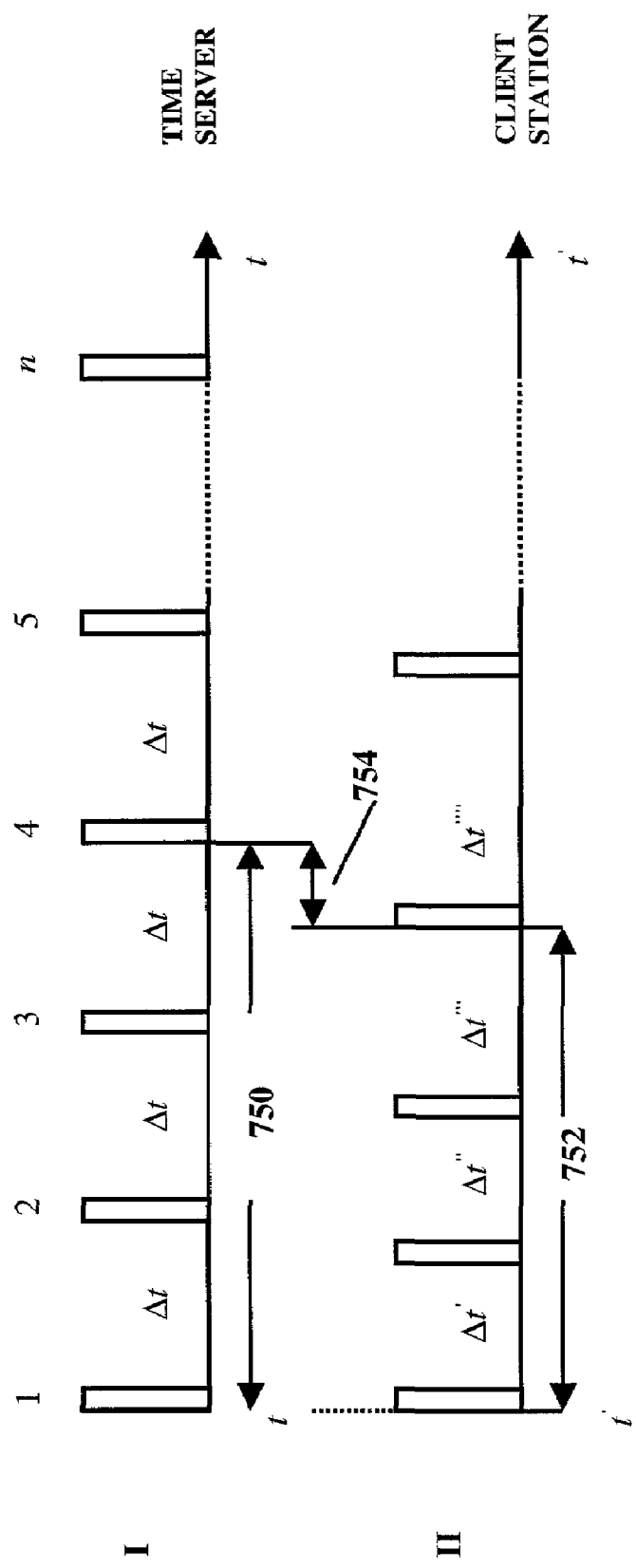
FIG. 7d is a timing diagram illustrating evaluation of the timing of the plurality of pulses according to the method shown in FIG. 7c.

Referring to FIGS. 7c and 7d a more accurate method for calculating the transmission time of the packets from the time server 3 to the client station 1 is shown. FIG. 7c illustrates the processing steps of the method. FIG. 7d shows time diagrams for the pulses sent from the time server I and received at the client station II. First, a round trip delay value for the first packet of the plurality of packets is determined. A first time difference 750 between the first packet and a following packet is determined for each of the following packets at the time the packets have been sent from the time server 3 (shown in FIG. 7d for the fourth packet). In the next step a second time difference 752 between the first packet and a following packet is determined for each of the following packets at the local time the packets have been received at the client station 1 (shown in FIG. 7d for the fourth packet).

Subtracting the second time difference 752 from the first time difference 750 for each packet results in a third time difference 754 for each packet. A positive value for the third time difference indicates that the corresponding packet traveled faster from the time server 3 to the client station 1 than the first packet. Accordingly, a negative value is indicative of a slower transmission. Therefore, a packet having a minimum travel time from the time server 3 to the client station 1 is indicated by having the maximum third time difference. The assumed travel time of the first packet being half of its round trip time is then corrected by subtracting the maximum third time difference from half of the round trip delay value of the first packet resulting in a minimum travel time of the corresponding packet. Data indicative of a correct time are then calculated by adding the minimum travel time to the predetermined time of the corresponding packet.

Figure 7E:
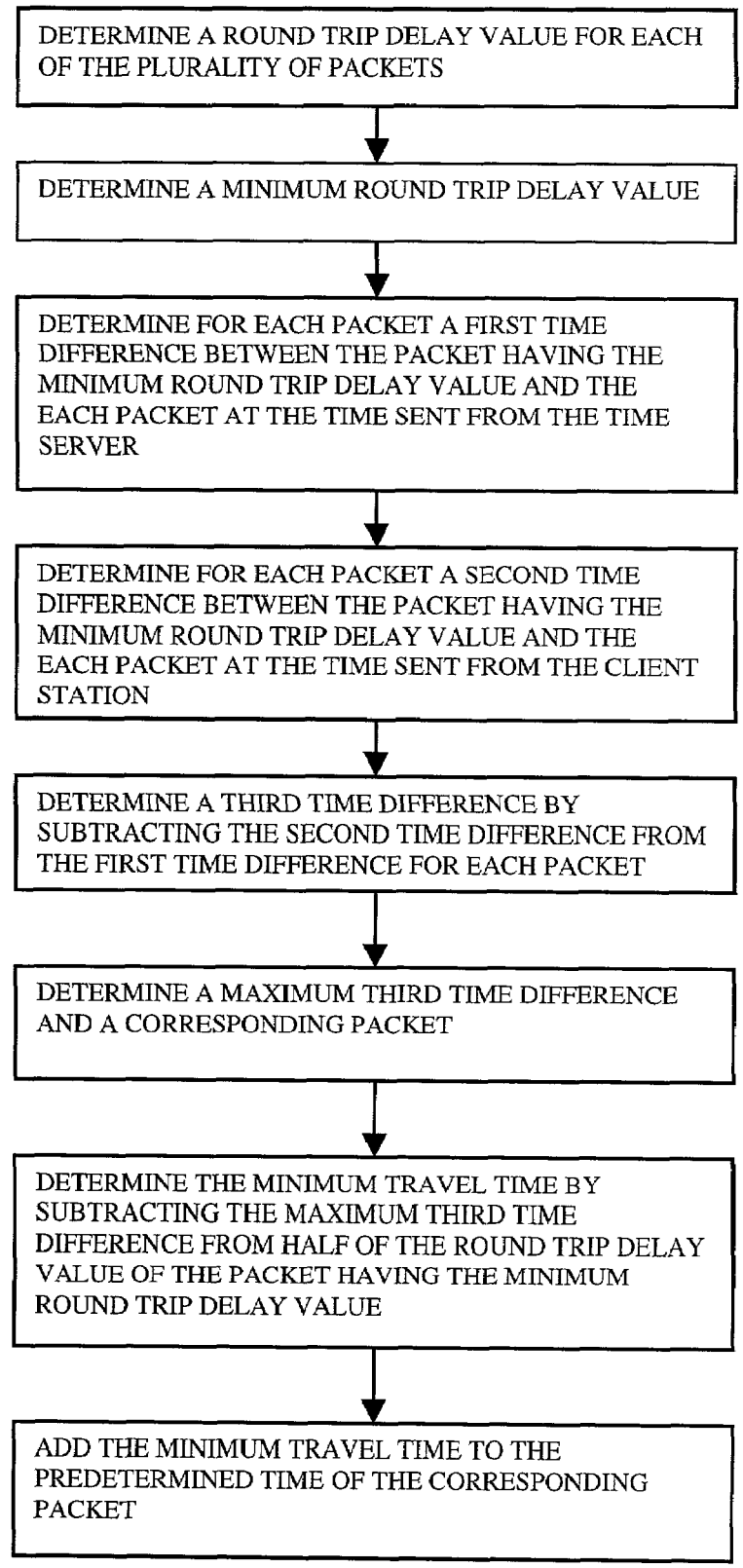
FIG. 7e is a simplified flow diagram of another method for determining data indicative of a time correction according to the invention.
Figure 7F:
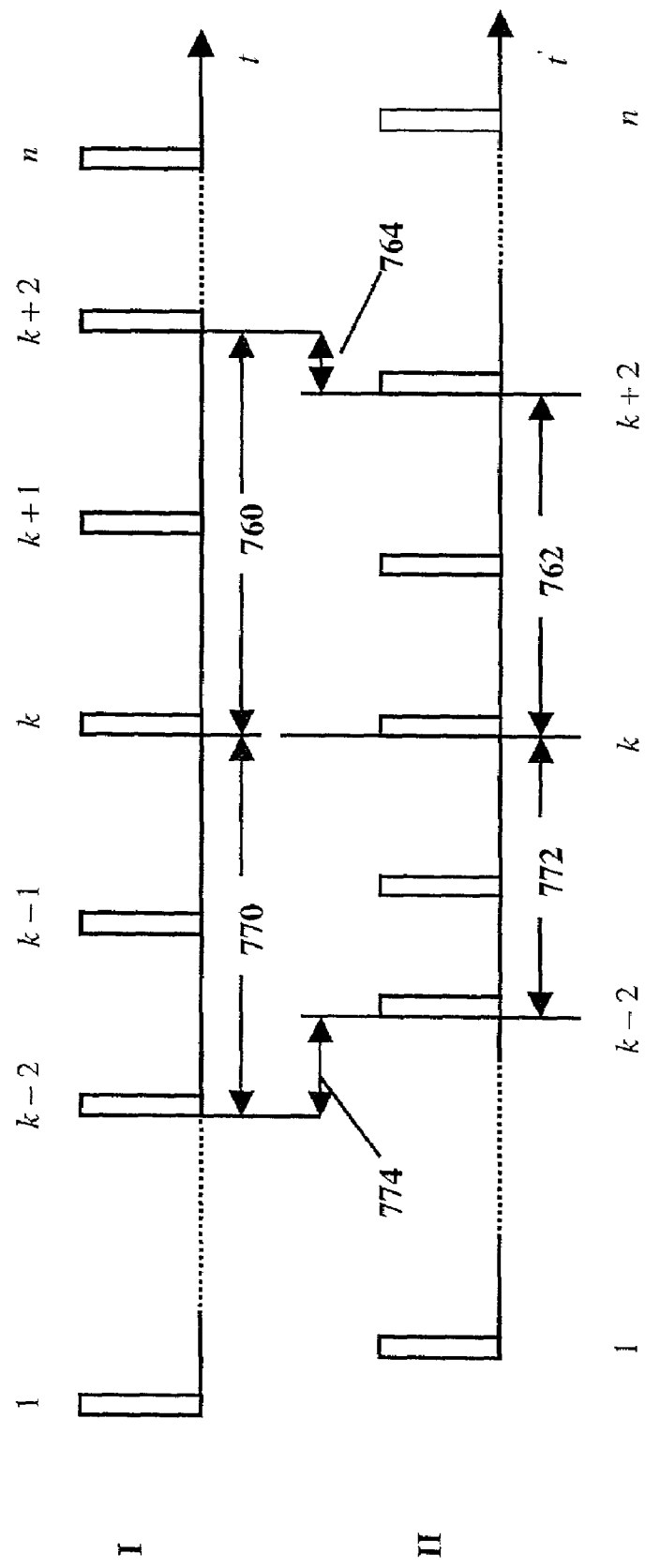
FIG. 7f is a timing diagram illustrating evaluation of the timing of the plurality of pulses according to the method shown in FIG. 7e; and, FIG. 7g is a simplified flow diagram of yet another method for determining data indicative of a time correction according to the invention.

Accuracy of the above method is further improved by determining a minimum round trip delay value and a corresponding packet instead of the first packet for the assumption that the travel time from the time server 3 to the client station 1 is half the round trip delay value, which is then corrected. This improved method is shown in FIGS. 7e and 7f. It differs from the above method by including the step of determining a minimum round trip delay value and a corresponding packet. Then the first and second time differences are determined between the packet having the minimum round trip delay value and each of the other packets of the plurality of packets. FIG. 7f shows time diagrams for first time differences 760 and 770, with k being the packet having minimum round trip delay and k−2 being a packet sent before the k$^{th}$ packet and k+2 being a packet sent after the k$^{th}$ packet. Time differences of packets sent before the k$^{th}$ packet are of negative value. Analogously, second time differences 762 and 772 and third time differences 764 and 774 are shown in FIG. 7f. As described above the packet having a minimum travel time from the time server 3 to the client station 1 is indicated by the maximum third time difference. A minimum travel time from the time server 3 to the client station 1 is then determined by subtracting the maximum third time difference from half of the round trip delay value of the packet having the minimum round trip delay. Data indicative of a correct time are then calculated by adding the minimum travel time to the predetermined time of the corresponding packet.

Figure 7G:
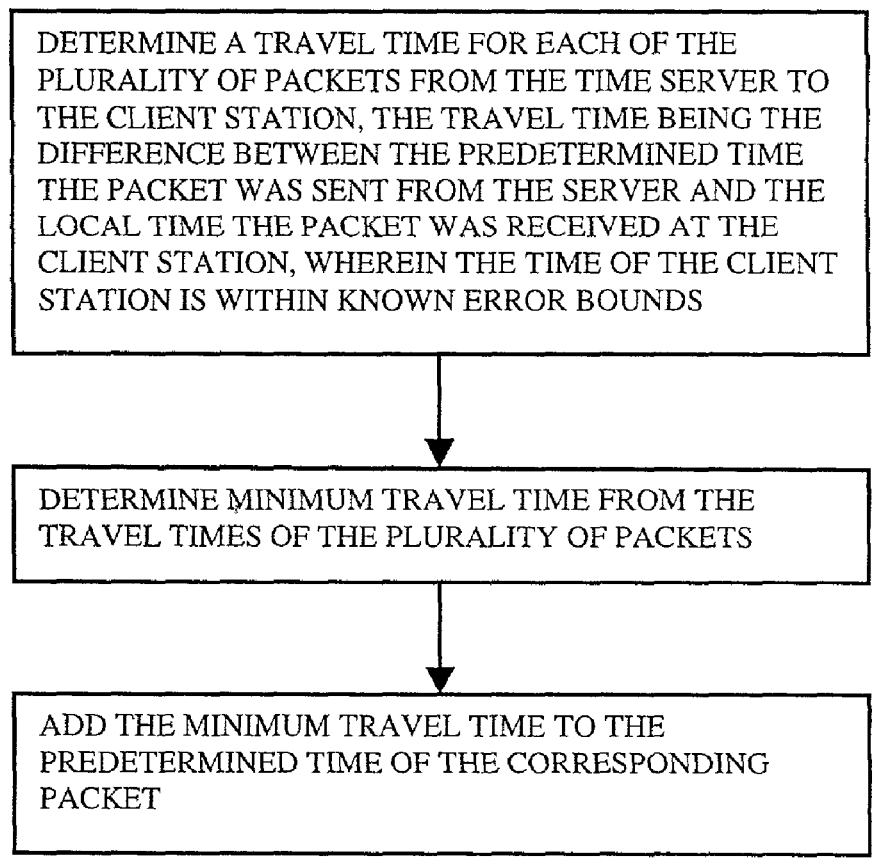

If it is known that a local time of a client station 1 is within known error bounds, preferably, the error being less than half the round trip delay value, the method according to the invention shown in FIG. 7g can be applied. A travel time for each of the plurality of packets from the time server to the client station is determined as the difference between the predetermined time the packet was sent from the server and the local time the packet was received at the client station. Preferably, a minimum travel time is determined and added to the predetermined time of the corresponding packet in order to obtain data indicative of a correct time. Optionally, two minimum travel times are determined based on the time for a packet to travel from the server to a client—based on the two different time sources—and a time for a packet to travel back to the server. The two minimum travel times are then used with the packet arrival times to determine data indicative of a correct time for synchronization of the client system.

The methods for synchronizing a timing device of a client station according to the invention are highly advantageous over the prior art. Transmitting a plurality of packets and evaluating the transmission of the plurality of packets substantially increases accuracy if a sufficiently large number of packets are used having predetermined spacing therebetween. Furthermore, it allows statistical evaluation of the transmission through the network in order to detect any irregularities such as technical problems or tampering with the packets by an unauthorized third party.

Another advantage of the methods according to the invention is the reduction in real time processing required, only the steps of transmitting the plurality of packets and determining a time of receipt of the packets have to be performed in real time. These steps do not require much processing and can be performed parallel to other tasks.

The methods as disclosed above are easily implemented in the system shown in FIG. 1a, for example, as a software package for execution on processors 7 and 9 of the client station 1 and the time server 3, respectively. The software may be distributed on a CD-ROM or via the communications network 2. Alternatively, processors 11 and 13 for synchronizing the timing device 4 are connected to the client station 1 and the time server 3, respectively, as a peripheral device.

Of course, numerous other embodiments may be envisaged without departing from the spirit and scope of the claimed invention.

What is claimed is:

1. A method of synchronizing a timing device of a client station comprising the steps of:
   a) sending a plurality of packets, each packet being sent at a predetermined time and having a predetermined temporal spacing from other packets, from a time server to the client station via a communications network having unknown transmission time variations;
   b) receiving the plurality of packets at the client station;
   c) determining a time indicative of a local time of receipt of each packet of the plurality of packets at the client station and storing time data in dependence thereon;
   d) returning the plurality of packets to the time server via the communications network;
   e) determining a time indicative of a local time of receipt of each packet of the plurality of packets at the time server; and,
   f) determining synchronization data in dependence upon round trip delay of the packets and in dependence upon variance in temporal spacing of received packets relative to the predetermined temporal spacing, the synchronization data relating to an estimate of a minimum travel time of a packet between the time server and the client station via a communications network having unknown transmission time variations that are significant relative to the minimum travel time,
   wherein each packet comprises a binary signal of m bits, the binary signal comprising an identifier of the packet and an identifier of the time server.

2. A method of synchronizing a timing device of a client station as defined in claim 1, wherein the identifier of the time server comprises at least a random number.

3. A method of synchronizing a timing device of a client station as defined in claim 1, comprising the step of:
   attaching to at least one of the packets authentication data for identifying the client station, the data attached by the client station.

4. A method of synchronizing a timing device of a client station as defined in claim 3, comprising the steps of:
   comparing upon receipt of the packets at the time server the authentication data identifying the client station with reference authentication data; and,
   if the comparison result is not indicative of a match, repeating steps a) to e).

5. A method of synchronizing a timing device of a client station as defined in claim 1, comprising the steps of:
   comparing upon receipt of the packets at the time server the identifier of the time server with a reference identifier; and,
   if the comparison result is not indicative of a match, repeating steps a) to e).

6. A method of synchronizing a timing device of a client station as defined in claim 5, comprising the steps of:
   g) comparing the synchronization data to threshold values;
   h) determining data indicative of a time correction if the determined data of step f) are within the threshold values; and,
   i) sending a signal comprising the data indicative of a time correction from the time server to the client station, wherein step h) comprises the steps of:
   determining a round trip delay value for each of the plurality of packets;
   determining a minimum round trip delay value; and,
   calculating data indicative of a correct time by adding half of the minimum round trip delay value to the predetermined time the packet having the minimum round trip delay value has been sent by the server.

7. A method of synchronizing a timing device of a client station as defined in claim 1, comprising the step of:
   time-stamping each of the packets at the client station by adding time data indicative of the client station's timing device time at the time instance of receipt of each of the packets.

8. A method of synchronizing a timing device of a client station as defined in claim 7, comprising the steps of:
   g) comparing the synchronization data to threshold values;
   h) determining data indicative of a time correction if the determined data of step f) are within the threshold values; and,
   i) sending a signal comprising the data indicative of a time correction from the time server to the client station: wherein step h) comprises the steps of:
   determining a round trip delay value for the first packet of the plurality of packets;
   determining for each packet following the first packet a first time difference between the first packet and the each packet at the time sent from the server;
   determining for the each packet following the first packet a second time difference between the first packet and the each packet at the time received at the client station;
   determining a third time difference by subtracting the second time difference from the first time difference for the each packets;
   determining a maximum third time difference and a corresponding packet, the corresponding packet having a minimum travel time from the server to the client station;
   determining the minimum travel time by subtracting the maximum third time difference from half of the round trip delay value of the first packet; and,
   calculating data indicative of a correct time by adding the minimum travel time to the predetermined time of the corresponding packet.

9. A method of synchronizing a timing device of a client station as defined in claim 7, comprising the steps of:
  g) comparing the synchronization data to threshold values;
  h) determining data indicative of a time correction if the determined data of step f) are within the threshold values; and,
  i) sending a signal comprising the data indicative of a time correction from the time server to the client station, wherein step h) comprises the steps of:
  determining a round trip delay value for each of the plurality of packets;
  determining a minimum round trip delay value;
  determining for each packet a first time difference between the packet having the minimum round trip delay and the each packet at the time sent from the server, wherein time differences of packets sent before the packet having the minimum round trip delay are of negative value;
  determining for the each packet a second time difference between the packet having the minimum round trip delay and the each packet at the time received at the client station, wherein time differences of packets received before the packet having the minimum round trip delay are of negative value;
  determining a third time difference by subtracting the second time difference from the first time difference for the each packets;
  determining a maximum third time difference and a corresponding packet, the corresponding packet having a minimum travel time from the server to the client station;
  determining the minimum travel time by subtracting the maximum third time difference from half of the round trip delay value of the packet having the minimum round trip delay;
  calculating data indicative of a correct time by adding the minimum travel time to the predetermined time of the corresponding packet.

10. A method of synchronizing a timing device of a client station as defined in claim 7, comprising the steps of:
  g) comparing the synchronization data to threshold values,
  h) determining data indicative of a time correction if the determined data of step f) are within the threshold values; and,
  i) sending a signal comprising the data indicative of a time correction from the time server to the client station, wherein step h) comprises the steps of:
  determining a travel time for each of the plurality of packets from the time server to the client station, the travel time being the difference between the predetermined time the packet was sent from the server and the local time the packet was received at the client station, wherein the time of the client station is within known error bounds;
  determining a minimum travel time from the travel times of the plurality of packets; and,
  calculating data indicative of a correct time by adding the minimum travel time to the predetermined time of the corresponding packet.

11. A method of synchronizing a timing device of a client station comprising the steps of:
  a) sending a plurality of packets, each packet being sent at a predetermined time and having a predetermined temporal spacing from other packets, from a time server to the client station via a communications network having unknown transmission time variations;
  b) receiving the plurality of packets at the client station;
  c) determining a time indicative of a local time of receipt of each packet of the plurality of packets at the client station and storing time data in dependence thereon;
  d) returning the plurality of packets to the time server via the communications network;
  e) determining a time indicative of a local time of receipt of each packet of the plurality of packets at the time server;
  f) determining synchronization data in dependence upon round trip delay of the packets and in dependence upon variance in temporal spacing of received packets relative to the predetermined temporal spacing, the synchronization data relating to an estimate of a minimum travel time of a packet between the time server and the client station via a communications network having unknown transmission time variations that are significant relative to the minimum travel time;
  g) comparing the synchronization data to threshold values;
  h) determining data indicative of a time correction if the determined data of step f) are within the threshold values; and,
  i) sending a signal comprising the data indicative of a time correction from the time server to the client station, wherein step i) comprises the step of:
  signing securely at the time server the signal comprising the data indicative of a time correction.

12. A method of synchronizing a timing device of a client station as defined in claim 11, comprising the steps of:
  receiving the signal comprising the data indicative of a correct time at the client station;
  verifying the signature of the time server; and,
  if the signature is verified, synchronizing the timing device of the client station in dependence upon the received signal.

13. A method of synchronizing a timing device of a client station, comprising the steps of:
  a) sending a plurality of packets, each packet being sent at a predetermined time and having a predetermined temporal spacing from other packets, from a time server to the client station via a communications network having unknown transmission time variations;
  b) receiving the plurality of packets at the client station;
  c) determining a time indicative of a local time of receipt of each packet of the plurality of packets at the client station and storing time data in dependence thereon;
  d) returning the plurality of packets to the time server via the communications network,
  e) determining a time indicative of a local time of receipt of each packet of the plurality of packets at the time server;
  f) determining synchronization data in dependence upon round trip delay of the packets and in dependence upon variance in temporal spacing of received packets relative to the predetermined temporal spacing, the synchronization data relating to an estimate of a minimum travel time of a packet between the time server and the client station via a communications network having unknown transmission time variations that are significant relative to the minimum travel time; and,
  g) providing a warning signal if the round trip delays of the packets are not within a threshold value, the threshold value being determined using a statistical estimate of round trip delays of the communications network.

14. A method of synchronizing a timing device of a client station comprising the steps of:
- a) sending a plurality of packets, each packet being sent at a predetermined time and having a predetermined temporal spacing from other packets, from a time server to the client station via a communications network having unknown unknown transmission time variations;
- b) receiving the plurality of packets at the client station;
- c) determining a time indicative of a local time of receipt of each packet of the plurality of packets at the client station and storing time data in dependence thereon,
- d) returning the plurality of packets to the time server via the communications network;
- e) determining a time indicative of a local time of receipt of each packet of the plurality of packets at the time server;
- f) determining synchronization data in dependence upon round trip delay of the packets and in dependence upon variance in temporal spacing of received packets relative to the predetermined temporal spacing, the synchronization data relating to an estimate of a minimum travel time of a packet between the time server and the client station via a communications network having unknown transmission time variations that are significant relative to the minimum travel time
- g) comparing the synchronization data to threshold values;
- h) determining data indicative of a time correction if the determined data of step f) are within the threshold values; and,
- i) sending a signal comprising the data indicative of a time correction from the time server to the client station, wherein step h) comprises the steps of:
  determining a round trip delay value for each of the plurality of packets;
  determining a minimum round trip delay value by interpolating using at least two round trip delay values;
  determining an interpolated predetermined time corresponding to the interpolated round trip delay value; and,
  calculating data indicative of a correct time by adding half of the interpolated minimum round trip delay value to the interpolated predetermined time.

15. A method of synchronizing a timing device coupled to a communications network comprising the steps of:
- a) sending a plurality of packets, each packet being sent at a predetermined time, from a first node to a second node via a communications network having unknown transmission time variations;
- b) receiving the plurality of packets at the second node;
- c) determining a time indicative of a local time of receipt of each packet of the plurality of packets and providing time data in dependence thereon;
- d) returning the plurality of packets to the first node via the communications network;
- e) determining a time indicative of a local time of receipt of each packet of the plurality of packets at the first node; and,
- f) determining data in dependence upon round trip delay of the packets and variance in packet spacing and comparing the data to threshold values, the data relating to an estimate of a minimum travel time of a packet between the first node and the second node via a communications network having unknown transmission time variations that are significant relative to the minimum travel time,
- g) determining data indicative of a time correction if the determined data of step f) are within the threshold values, wherein the provided time data is appended to a packet and is returned with the packet to the first node.

16. A method of synchronizing a timing device coupled to a communications network comprising the steps of:
- a) sending a plurality of packets, each packet being sent at a predetermined time, from a first node to a second node via a communications network having unknown transmission time variations;
- b) receiving the plurality of packets at the second node;
- c) determining a time indicative of a local time of receipt of each packet of the plurality of packets and providing time data in dependence thereon;
- d) returning the plurality of packets to the first node via the communications network;
- e) determining a time indicative of a local time of receipt of each packet of the plurality of packets at the first node; and,
- f) determining data in dependence upon round trip delay of the packets and variance in packet spacing and comparing the data to threshold values, the data relating to an estimate of a minimum travel time of a packet between the first node and the second node via a communications network having unknown transmission time variations that are significant relative to the minimum travel time, wherein in step (c) each of the packets is time stamped with a local time of the second node.

17. A system of synchronizing a timing device of a client station via a communications network comprising:
first processing means connected to the communications network and a time clock; and, second processing means connected to the communications network and the tinning device,
wherein the first processing means comprise:
- means for sending in real time a plurality of packets, each packet being sent at a predetermined time, via the communications network to second processing means;
- means for receiving the plurality of packets from the second processing means in real time;
- means for determining in real time a time indicative of a time of receipt of each of the plurality of packets;
- means for determining data in dependence upon round trip delay of the packets and variance in packet temporal spacing and comparing the data to threshold values;
- means for determining data indicative of a correct time in dependence upon time data from the time clock and the data in dependence upon round trip delay of the packets and variance in packet temporal spacing; and,
- means for sending a signal comprising the data indicative of a time correction to the second processing means via the communications network;

and,
wherein the second processing means comprise:
- means for receiving a plurality of packets from the first processing means in real time;
- means for determining in real time a time indicative of a time of receipt of each of the plurality of packets;
- means for returning the plurality of packets in real time to the first processing means;
- means for receiving a signal comprising the data indicative of a time correction from the first processing means;

means for synchronizing the timing device in dependence upon the data indicative of the time correction; and, means for time-stamping each of the packets in real time.

18. A system of synchronizing a timing device of a client station via a communications network as defined in claim 17, the first processing means comprising means for retrieving time data from each time stamped packet.

19. A system of synchronizing a timing device of a client station via a communications network comprising:

first processing means connected to the communications network and a time clock; and, second processing means connected to the communications network and the timing device, wherein the first processing means comprise:

means for sending in real time a plurality of packets, each packet being sent at a predetermined time, via the communications network to second processing means;

means for receiving the plurality of packets from the second processing means in real time;

means for determining in real time a time indicative of a time of receipt of each of the plurality of packets;

means for determining data in dependence upon round trip delay of the packets and variance in packet temporal spacing and comparing the data to threshold values;

means for determining data indicative of a correct time in dependence upon time data from the time clock and the data in dependence upon round trip delay of the packets and variance in packet temporal spacing; and, means for sending a signal comprising the data indicative of a time correction to the second processing means via the communications network;

and, wherein the second processing means comprise:

means for receiving a plurality of packets from the first processing means in real time;

means for determining in real time a time indicative of a time of receipt of each of the plurality of packets;

means for returning the plurality of packets in real time to the first processing means;

means for receiving a signal comprising the data indicative of a time correction from the first processing means;

means for synchronizing the timing device in dependence upon the data indicative of the time correction; and, means for attaching in real time to at least one of the packets an authenticator identifying the client station.

20. A system of synchronizing a timing device of a client station via a communications network as defined in claim 19, the first processing means comprising means for identifying the client station by its authenticator.

* * * * *